Sept. 26, 1950  J. W. LEIGHTON  2,523,473
ANTISWAY DEVICE
Filed June 7, 1945  2 Sheets-Sheet 1
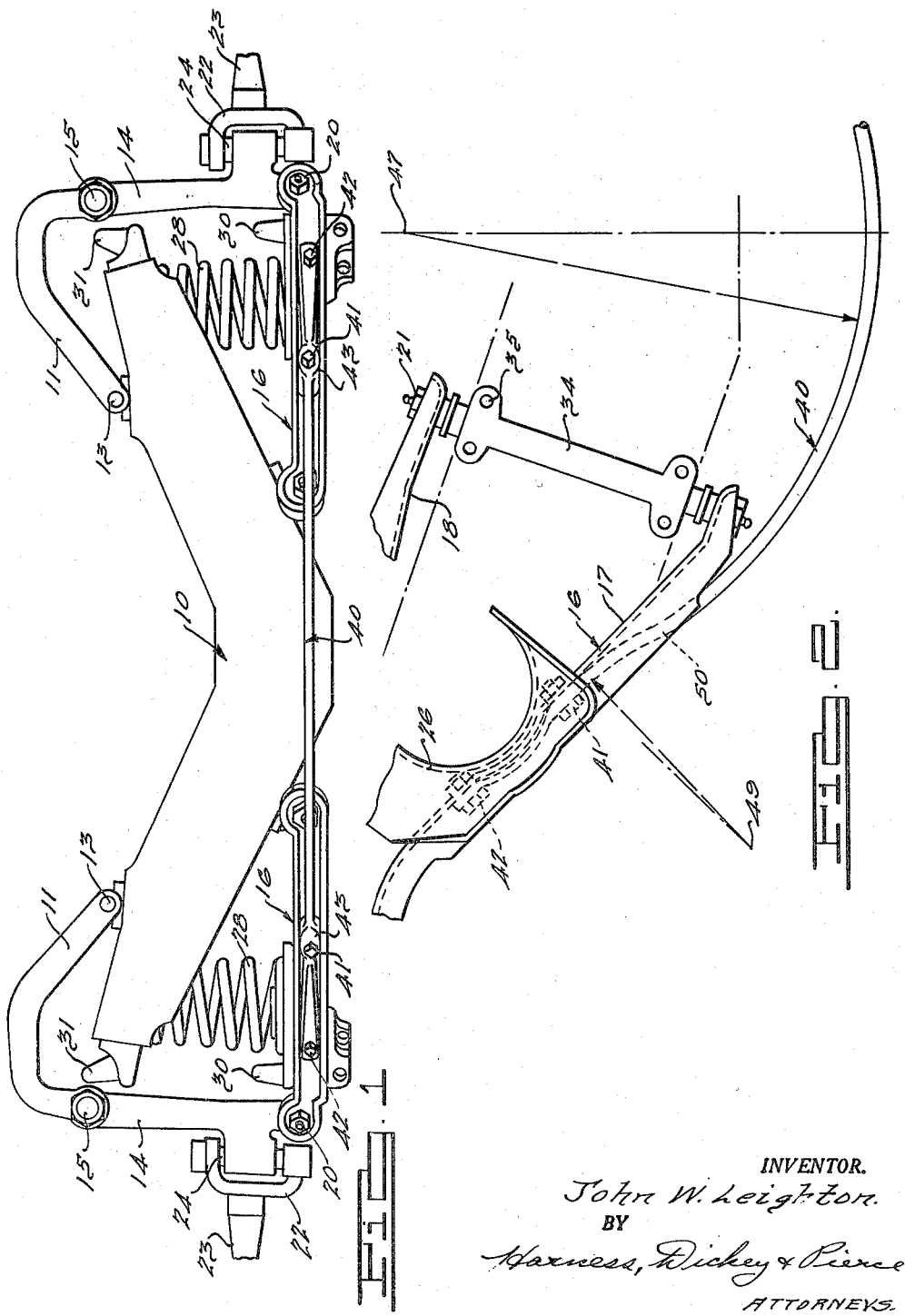
INVENTOR.
John W. Leighton.
BY
Harness, Dickey & Pierce.
ATTORNEYS.

Sept. 26, 1950　　　J. W. LEIGHTON　　　2,523,473
ANTISWAY DEVICE

Filed June 7, 1945　　　　　　　　　　　2 Sheets-Sheet 2

INVENTOR.
John W. Leighton.
BY
Harness, Dickey & Pierce
ATTORNEYS.

Patented Sept. 26, 1950

2,523,473

UNITED STATES PATENT OFFICE 2,523,473

ANTISWAY DEVICE

John W. Leighton, Port Huron, Mich.

Application June 7, 1945, Serial No. 598,122

2 Claims. (Cl. 267—11)

The invention relates generally to automobiles and particularly to sway or roll controlling devices and their effect on the riding qualities of the motor vehicle.

The invention in certain respects constitutes an improvement over that embodied in my copending application for patent, Serial No. 566,869, filed December 6, 1944. As stated in that application for patent, antisway devices used prior to the invention embodied therein, did not operate to prevent front end dip of the vehicle frame when the brakes were applied and likewise they did not operate to assist the conventional coil springs in the event both wheels engaged sizeable obstructions on the road at the same time. These devices included torsion bars turnable in bearings on the frame which are twisted or torsioned in the event the frame rolls or in the event one wheel moves alone relative to the other.

In view of the fact that the torsion bar has little or no effect towards preventing front end dip of the frame and does not help the springs in the event both wheels move simultaneously, it is necessary to have sufficiently stiff coil springs as to at least prevent a very undesirable dipping of the frame or movement thereof when the brakes are applied or both wheels strike obstructions at the same time. Stiffer coil springs were required under such conditions but the use of stiffer coil springs increases the hardness of the ride.

As was pointed out in the copending application for patent, the invention therein involves an antisway bar which provides additional spring resistance in the event the frame tends to dip when the brakes are applied or in the event both wheels hit obstructions simultaneously, and at the same time the device strongly resists rolling of the frame and provides spring resistance when either wheel moves independently. As a result, it is possible to soften the conventional coil springs since the antisway device provides additional spring resistance under all the conditions indicated. It follows therefore, that a softer and more comfortable ride is possible.

One object of the present invention is to provide an improved construction of antisway bar of the general character disclosed in the copending application for patent which is simple and economical to manufacture.

Another object of the invention is to provide an antisway bar of simple and inexpensive construction which is so constructed and arranged that it will be more durable when subjected to the bending stresses required in its operation.

Other objects of the invention will become apparent from the following specification, from the drawings relating thereto, and from the claims hereinafter set forth.

For a better understanding of the invention reference may be had to the drawings wherein:

Figure 1 is a front elevational view of a vehicle frame embodying oppositely disposed wheel suspensions connected by sway preventing means constructed according to one form of the invention;

Fig. 2 is a fragmentary plan view of the construction shown by Fig. 1;

Figure 3:
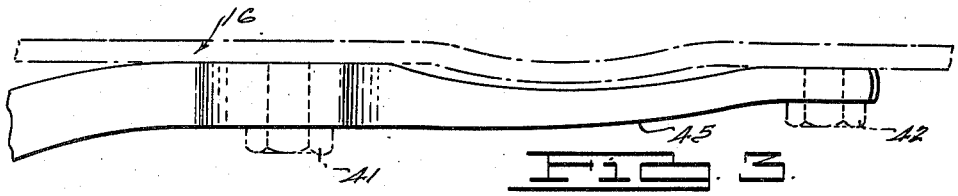
Fig. 3 is a fragmentary plan view showing the construction of the end portion of the antisway bar.

Referring to Fig. 1 the frame of the vehicle is indicated at 10 and it should be understood that the frame may be of an ordinary type having side members extending longitudinally of the vehicle and rear and front cross members. The portion of the frame shown in Fig. 1 may be considered generally as the front cross member of the frame.

Each of the individual wheel suspensions comprises an upper arm 11 which is pivotally connected to the frame by means indicated at 13, and pivotally connected to a vertically disposed wheel supporting member 14 by pivotal means indicated at 15. The lower arm of the suspension is indicated at 16 and as best shown by Fig. 2 comprises a pair of arms 17 and 18. These arms at their outer ends are pivotally connected as indicated at 20 to the lower end of the wheel supporting member 14 while the inner ends of the arm are pivotally connected as indicated generally at 21 to the underside of the frame cross member. A wheel supporting knuckle 22 and a wheel axle 23 thereon are connected to the wheel supporting member 14 by a vertically disposed king pin indicated at 24 so that the wheel may swing about the axis of the king pin.

Between the end of the cross frame member and a pan 26 on the lower arm 16, a coil supporting spring 28 is provided so that the frame is supported by the spring, and the spring in turn is supported by the arm. A rubber bumper 30 is provided on the outer end of the lower arm 16 for engagement with the end of the frame so as to limit relative movement of the arm and frame in one direction, while a similar bumper 31 is provided on the upper side of the frame for engagement with arm 11 so as to limit a reverse relative movement of the frame and arms.

The suspension shown in Fig. 1 may be substantially like that shown in applicant's Patent No. 2,321,832, and it should be understood in connection with this patent that the pivotal connections 13 and 21 may comprise control bars such as indicated at 34 in Fig. 2, and that the arms have threaded pivotal connections with the ends of these bars. The bars in turn are connected to the cross frame member by fastening means indicated at 35. The pivotal connections 15 and 20 likewise may correspond to those shown in applicant's prior patent, and from this it follows that swinging of the arms can occur about the pivotal connections 13 and 21, and that likewise the wheel supporting member 14 and arms are hingedly connected by the pivotal means 15 and 20. The opposite wheel suspension is identical to the suspension described and therefore it is unnecessary to describe it here.

Figure 4:
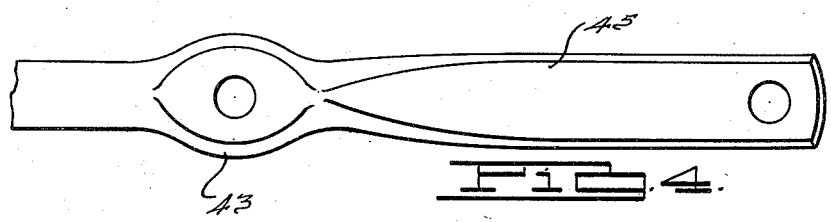
Fig. 4 is a front elevational view of the structure shown by Fig. 3.

The antisway device constructed according to the present invention is shown as comprising a round, resilient metal bar extending transversely of the vehicle and this bar as best shown by Figs. 3 and 4, is secured rigidly at each end to the lower arm 16 by means of bolts 41 and 42. It will be observed that those parts of the bar through which the bolts 41 extend are substantially as thick as the intermediate and round part of the bar, but that they are enlarged radially substantially as indicated at 43 so as to provide a desired strength and resistance to bending stresses. It should be evident that if the bolts 41 and 42 rigidly hold each end portion of the bar connected to the arm 16, any bending of the bar will create substantial bending stresses adjacent the bolts 41, and that by increasing the sectional dimensions of the bar at each bolt 41, a greater resistance to bending may be obtained so as to lower the stress in the bar adjacent such bolts and to cause the stresses to be more evenly distributed in the bar. Also, between the two enlargements, the bar is sufficiently long and is held accurately to dimensions and size so as to avoid high stresses at any point between the points of attachment to the suspensions.

Formation of the enlarged portion 43 may be effected by upsetting the bar through axial forces so as to cause the bar to become enlarged. After upsetting of the metal, it can be flattened on opposite sides to the desired thickness and then the bolt receiving opening may be made. Between the enlarged portion 43 and the end of the bar, the metal may be flattened as indicated at 45. In conjunction with the flat surface of the bar engaging the arm 16, the bolts rigidly connect the bar to the arm.

Between the two end portions or in other words, between the two enlarged portions 43, the particular bar shown in Fig. 2 of the drawings is curved generally about a center 47 located on the center line of the vehicle, while adjacent each bolted end portion, the bar is shown as reversely curved substantially about a center 49 with the two curved portions meeting at about the point 50.

The bar as so illustrated, is curved in a particular way to co-operate with the vehicle and suspensions shown, but its shape may vary. It is important that the bar be constructed of bar stock heat treated to retain the desired resiliency or spring characteristics, and it is evident that different size bars and bars bent to conform to different patterns may be employed so as to vary the spring characteristics, provided however, that the same characteristics prevail at opposite sides of the center line of the vehicle. Each longitudinal half of the bar from its center is substantially identical to the other in spring characteristics, configuration and dimensions so that the bending stress characteristics for each half will be substantially the same. The spring or resilient characteristics of the bar and its length and size must be such that the intermediate portion of the bar between the points of attachment can bend as required in operation of the vehicle, including the reverse bending which resists frame roll or sway, without causing overstressing of the bar at any point or causing the elastic limit of any bending part of the bar to be reached. When the bar is applied to the suspensions, its connections 43 are in line with the pivots 21 under normal load on the frame and therefore any relative movement of either arm and the frame must cause the connection 43 on such arm to arc either to one side or the other of this in line position. Hence, the points 43 are farthest apart with the bar under no bending stress in this in line position.

Figure 5:
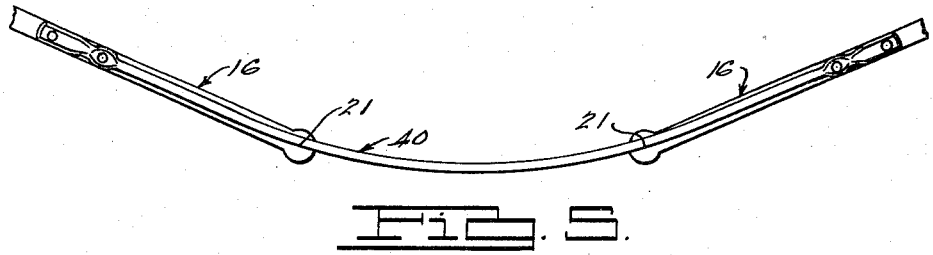
Fig. 5 is a diagrammatic view illustrating movements of the spring wheel suspensions and antisway device when both wheels move vertically with respect to the frame at the same time.

Fig. 5 shows generally the action of the bar in the event both wheels are lifted or elevated when the vehicle is running along the road in a straight line, as for instance when both wheels engage an obstruction in the road at the same time. When this occurs, the bar is free to bend over its entire length between the connections or enlarged portions 43. Likewise, if both wheels should engage a depression in the road at the same time, the bar would be free to bend over its entire length, but of course, the bending would be in the reverse direction. A similar action occurs when the brakes are applied suddenly in which event the front end of the frame tends to dip.

Figure 6:
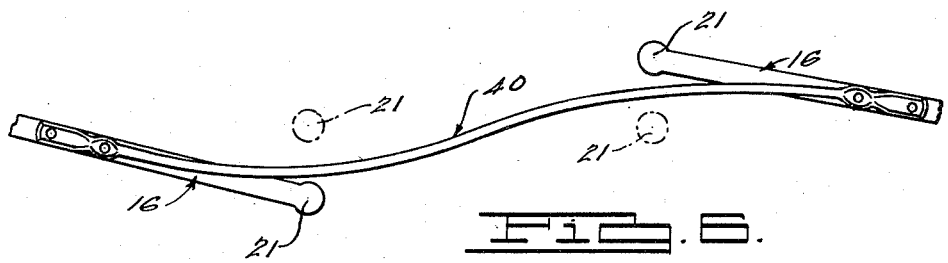
Fig. 6 illustrates the movement of the wheel suspensions and antisway device when the frame or body of the vehicle tends to roll laterally in one direction; and, Fig. 7 is a similar diagrammatic view illustrating movement of the parts when one wheel alone moves vertically.

When the direction of the vehicle is changed or turned from that of a straight line direction, the body and frame tend to roll, and this action tends to elevate the pivotal point 21 at the inside of the turn and to lower the pivotal point 21 at the outside of the turn. When this condition occurs as has been illustrated diagrammatically in Fig. 6, the resilient bar does not bend in one direction throughout its length as occurs in the case in connection with Fig. 5. Instead, the arms 16 at opposite sides of the frame will tend to bend the bar in opposite directions so that the central portion of the bar does not move upwardly or downwardly in a free manner as previously mentioned. Being fastened to both arms at its ends, it bends in opposite directions from a point at the center of its length so that in effect the bar is changed into two short bars which must be separately bent as the body rolls or sways. Manifestly, the resistance to bending is increased greatly under such conditions, and as a result body roll or sway is strongly resisted. The parts are shown in exaggerated positions in Fig. 6 in order to illustrate this action and normally the pivot points 21 are strongly held against movement from their broken line positions. In other words, the bar resists vertical separation of the pivotal points 21 and thus resists body sway or roll.

Figure 7:
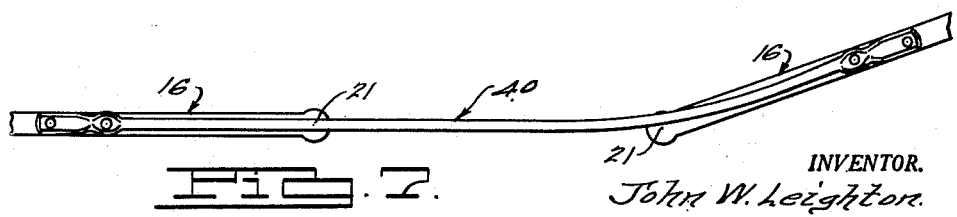

In Fig. 7, bending of the bar is shown as may occur when one wheel alone strikes an obstacle and moves upwardly. The coil spring at that side, compresses and the bar bends substantially as shown. If the wheel strikes a depression, the action would be substantially the same but in the opposite direction. Under all conditions therefore, the bar acts in conjunction with the coil spring to absorb vertical movement of the wheels when they strike obstructions or depressions simultaneously or separately or when the front end of the frame tends to dip due to sudden application of the brakes. Also where the vehicle makes a turn, the bar acts strongly to prevent roll or bending of the frame. Finally, it should be appreciated that in the normal operation of the car over normal roads, the car may have the desired soft riding qualities due to the fact that the springs may be designed to give a constant and desirable spring rate.

It may be noted generally that for small relative movements of the frame and wheels, such as where both wheels move vertically or where one wheel moves vertically or where the frame tends to move vertically, the bar adds but slight spring resistance since from its normally straight position, it is not difficult to bend it rather freely within a small range of movement. However, as the relative movement increases, the resistance of the bar to bending rapidly increases. As a result then, in normal operation, a very soft ride is obtainable since the coil springs support the frame and these may be designed for a soft ride. However, upon any appreciable increase in relative vertical movement of the wheels and frame, the resistance to such movement increases rapidly due to increased bending of the bar. Thus, it might be said that the bar allows a soft and easy riding condition of the frame on the coil springs unless substantial relative movement of the wheels and frame tends to occur and then the bar rapidly acts with increasing resistance to prevent such movements so as to hold the frame steady and level. The resistance to any tilting movement of the frame laterally when making a turn becomes markedly pronounced as is readily evident.

Although only one form of the invention has been illustrated and described in detail, it will be apparent to those skilled in the art that various modifications may be made without departing from the scope of the claims.

What is claimed is:

1. In combination, a vehicle frame, an individual wheel suspension at each side of the frame and including a laterally extending arm hinged at its inner end to the frame for pivotal movement about an axis extending longitudinally of the frame, a spring-like, resilient metal bar extending laterally of the frame and having substantial linear portions at its ends laying along the arms respectively between the inner and outer ends thereof and rigidly connected thereto, said bar being of sufficient length and size as to prevent overstressing of the bar at any point through bending caused by movement of the arms during operation of the vehicle, each of said end portions having an apertured enlargement spaced inwardly from its ends so as to leave a substantial linear attaching portion between the enlargement and end.

2. In combination, a vehicle frame, an individual wheel suspension at each side of the frame and including a laterally extending arm hinged at its inner end to the frame for pivotal movement about an axis extending longitudinally of the frame, a spring-like, resilient metal bar extending laterally of the frame and having substantial linear portions at its ends laying along the arms respectively between the inner and outer ends thereof, means rigidly connecting the end portions of the bar to the arm and comprising linearly spaced openings in each end portion with the bar enlarged in the region of the inner opening in each end portion, said bar intermediate the enlargements being bent at opposite sides of its longitudinal center and such intermediate portion of the bar being of such size and length as to prevent overstressing of the bar at any point through bending caused by movement of the arms during operation of the vehicle.

JOHN W. LEIGHTON.

REFERENCES CITED

The following references are of record in the file of this patent:

UNITED STATES PATENTS

| Number | Name | Date |
|---|---|---|
| 473,881 | Johnson | Apr. 26, 1892 |
| 475,304 | Faske | May 24, 1892 |
| 1,130,157 | Elling | Mar. 2, 1915 |
| 1,742,387 | Gatter | Jan. 7, 1930 |
| 2,110,275 | Rabe | Mar. 8, 1938 |
| 2,254,261 | Best | Sept. 2, 1941 |

FOREIGN PATENTS

| Number | Country | Date |
|---|---|---|
| 605,249 | France | Feb. 13, 1926 |

Certificate of Correction

Patent No. 2,523,473                                September 26, 1950

JOHN W. LEIGHTON

It is hereby certified that error appears in the printed specification of the above numbered patent requiring correction as follows:

Column 6, list of references cited, under "UNITED STATES PATENTS" insert the following:

2,201,250     Utz ------------------ May 21, 1940 and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*